(12) United States Patent
Grunbeck et al.

(10) Patent No.: US 6,445,868 B1
(45) Date of Patent: Sep. 3, 2002

(54) OPTICAL FIBER FEEDTHROUGH ASSEMBLY AND METHOD OF MAKING SAME

(75) Inventors: John Grunbeck, Northford; Christopher Chipman, Scotland; Bradley A. Currier, Guilford; Robert J. Maron, Cromwell, all of CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 09/628,114

(22) Filed: Jul. 28, 2000

(51) Int. Cl.⁷ .................................................. G02B 6/00
(52) U.S. Cl. ........................................................ 385/138
(58) Field of Search .................................. 385/138, 135, 385/136, 92, 94

(56) References Cited

U.S. PATENT DOCUMENTS

| | | | |
|---|---|---|---|
| 4,296,996 A | * 10/1981 | Niiro et al. | 385/138 |
| 4,593,970 A | * 6/1986 | Rhodes | 385/138 |
| 5,177,806 A | * 1/1993 | Abbott et al. | 385/76 |
| 5,659,651 A | * 8/1997 | Watanabe | 385/138 |
| 6,088,504 A | * 7/2000 | Filas et al. | 385/138 |

\* cited by examiner

*Primary Examiner*—Brian Sircus
*Assistant Examiner*—Brian S. Webb
(74) *Attorney, Agent, or Firm*—Cummings & Lockwood (57) ABSTRACT

In an optical waveguide feedthrough assembly, and method of making such an assembly, a tubular member defines an axially elongated, annular surface, and the annular surface forms an axially elongated optical feedthrough cavity. An optical fiber or like waveguide is received through the axially-elongated optical feedthrough cavity, and is spaced radially inwardly relative to the annular surface to thereby define an axially-elongated annular cavity between the fiber and annular surface. An epoxy adhesive is introduced in its liquid phase into one end of the annular cavity, and is allowed to fill the annular cavity by capillary action. Upon filling the annular cavity, the epoxy hardens and cures and, in turn, adhesively secures the optical fiber within the tubular member. The annular surface defines a plurality of constrictions in the annular cavity to further secure the solid epoxy plug within the cavity, and prevent the plug from moving in response to axially-directed forces encountered in high pressure and/or high temperature applications.

43 Claims, 3 Drawing Sheets

OPTICAL FIBER FEEDTHROUGH ASSEMBLY AND METHOD OF MAKING SAME

CROSS REFERENCE TO RELATED APPLICATIONS

Copending U.S. patent applications, Ser. No. 09/628,264, entitled "Optical Fiber Bulkhead Feedthrough Assembly and Method of Making Same" to Daigle et al., filed contemporaneously herewith, contains subject matter related to that disclosed herein.

TECHNICAL FIELD

The present invention relates to feedthroughs for optical waveguides, and more particularly, to hermetically sealed feedthroughs suitable for use in high pressure, high temperature, and/or other harsh environments.

BACKGROUND ART

In many industries and applications, there is a need to have small diameter wires or optical waveguides penetrate a wall, bulkhead, or other feedthrough member wherein a relatively high fluid or gas differential pressure exists across the feedthrough member. In addition, one or both sides of the feedthrough member may be subjected to relatively high temperatures and other harsh environmental conditions, such as corrosive or volatile gas, fluids and other materials. In the case of electrical wires, these devices, called feedthroughs or penetrators, typically are constructed by using electrically conductive metal 'pins' having a low thermal coefficient of expansion. The pins are concentrically located within a hole in a housing, and the resulting annular space is filled with a suitable sealing glass. Critical to the success of such seals is the selection and approximate matching of the thermal expansion rates of the various materials, i.e., the metal housing, sealing glass, and electrical pin. As the temperature range over which the feedthrough is exposed increases, the matching of thermal expansion rates becomes increasingly important in order to avoid failure of the feedthrough by excessive thermal stress at the interface layers between the various materials. This technology is relatively mature for electrical feedthroughs, and commercial devices are readily available that meet service temperatures in excess of 200° C.

Figure 3:
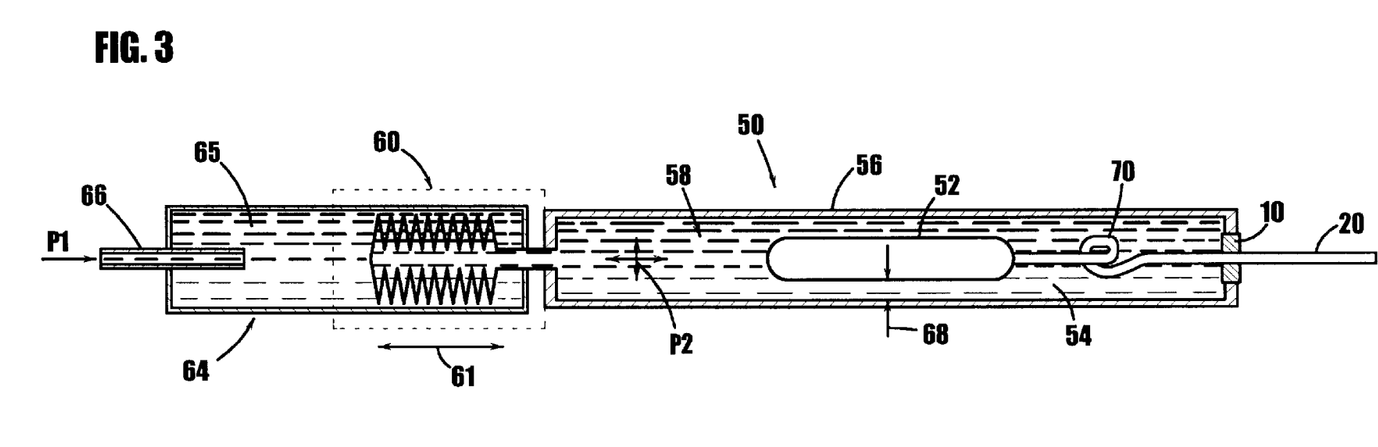
FIG. 3 is a somewhat schematic, cross-sectional view of an optical sensing assembly employing the optical waveguide feedthrough assembly of FIG. 1.

More recently, with the introduction of optical sensors, particularly sensors for use in oil and gas exploration and production, a need has emerged for a bulkhead feedthrough that can seal an optical fiber at high pressures of 20,000 psi and above, and high temperatures of 150° C. to 250° C., with desired service lives of 5 to 10 years. The sensing assembly of FIG. 3 is of the type disclosed in co-pending U.S. patent application Ser. No. 09/440,555 filed Nov. 15, 1999, entitled "Pressure Sensor Packaging For Harsh Environments", which is assigned to the Assignee of the present invention and is hereby expressly incorporated by reference as part of the present disclosure.

There are several problems associated with constructing such an optical fiber feedthrough. One of these problems is the susceptibility of the glass fiber to damage and breakage. This is due to the small size of the fiber, the brittle nature of the glass material, the susceptibility of the glass to stress corrosion cracking due to moisture exposure, and the typical presence of a significant stress concentration at the point at which the fiber enters and exits the feedthrough. Attempts to use a hard sealing glass, such as used with electrical feedthroughs, have had problems of this nature due to the high stress concentration at the fiber-to-sealing glass interface.

Another problem with sealing an optical fiber, as opposed to sealing an electrically-conductive metal 'pin' in an electrical feedthrough, is that the fused silica material of which the optical fiber is made, has an extremely low thermal expansion rate. Compared to most engineering materials, including metals, sealing glasses, and even the metal 'pins' typically used in electrical feedthroughs, the coefficient of thermal expansion of the optical fiber is essentially zero. This greatly increases the thermal stress problem at the glass-to-sealing material interface, particularly as the application temperatures rise.

One technique used to produce optical fiber feedthroughs is the use of a sealed window with a lensing system. In this technique, the optical fiber must be terminated on each side of a pressure-sealed window, thus allowing the light to pass from the fiber into a lens, through the window, into another lens, and finally into the second fiber. The disadvantages associated with this system include the non-continuous fiber path, the need to provide two fiber terminations thus increasing manufacturing complexity, and the light attenuation associated with these features.

Another approach to producing optical fiber feedthroughs involves passing the fiber through a bulkhead without termination, while providing a seal around the fiber to prevent leakage across the bulkhead. One such seal has been implemented by means of a sapphire compression fitting to take advantage of the pressure differential typically present across a bulkhead in a harsh environment. One disadvantage associated with this type of seal, however, is that it has been found to suffer from creep of material across the bulkhead in the direction of the decreasing pressure gradient, which can, in turn, compromise both the optical fiber and seal.

It is often desirable to mount fiber optic based sensors in harsh environments that are environmentally separated from other environments by physical bulkheads. An exemplary such fiber optic based sensor is disclosed in co-pending U.S. patent application Ser. No. 09/205,944 entitled "Tube-Encased Fiber Grating Pressure Sensor" to T. J. Bailey et al., which is assigned to the Assignee of the present invention and is hereby expressly incorporated by reference as part of the present disclosure. This exemplary optical sensor is encased within a tube and certain embodiments are disclosed wherein the sensor is suspended within a fluid. Some such fiber optic sensors have sensors and tubes that are comprised of glass, which tends to be relatively fragile, brittle and sensitive to cracking. Thus, the use of such a sensor in a harsh environment, such as where the sensor would be subjected to substantial levels of pressure, temperature, shock and/or vibration, presents a significant threat of damage to the sensor. In certain environments, such sensors are subjected to continuous temperatures in the range of 150° C. to 250° C., shock levels in excess of 100 Gs, and vibration levels of 5G RMS at typical frequencies between about 10 Hz and 200 Hz and pressures of about 15 kpsi or higher.

However, as discussed above, the harsh environments where the sensors are located generally must be isolated by sealed physical barriers from other proximate environments through which the optical fiber communication link of the sensor must pass. It is important to seal the bulkhead around the optical fiber to prevent adjacent environments from contamination, as well as to protect the optical fiber as it passes through adjacent environments. If the optical fiber is compromised by contamination from an adjacent harsh environment, the optical fiber and all sensors to which it is connected are likely to become useless.

Accordingly, it is an object of the present invention to provide an optical waveguide feedthrough assembly, and a method of making such an assembly, which overcomes one or more of the above-described drawbacks and disadvantages of the prior art, and is capable of relatively long-lasting operation at relatively high pressures and/or temperatures.

SUMMARY OF THE INVENTION

The present invention is directed to an optical waveguide feedthrough assembly for passing at least one optical waveguide, such as an optical fiber, through a sensor wall, bulkhead, or other feedthrough member. The feedthrough assembly of the present invention comprises a tubular member or like support defining an axially elongated, annular surface, wherein the annular surface forms an axially elongated optical feedthrough cavity. The optical fiber or like waveguide is received through the axially-elongated optical feedthrough cavity, and is spaced radially inwardly relative to the annular surface to thereby define an axially-elongated annular cavity between the fiber and annular surface. A sealant, such as an epoxy adhesive, is received within and substantially fills the annular cavity. The sealant exhibits adhesive properties at the interface of the sealant and optical fiber, and at the interface of the sealant and the annular surface, to adhesively secure and hermetically seal the optical fiber within the feedthrough cavity and substantially prevent axial movement of the sealant and optical fiber relative to the annular surface.

The optical feedthrough cavity is defined by an outer dimension having one or more variations along the axial direction thereof, and the dimensional variations cooperate with the sealant to further prevent axial movement of the sealant relative to the annular surface. In accordance with an embodiment of the present invention, the annular surface of the tubular member defines one or more annular constrictions or like radially projecting interruptions forming the variations in the outer dimension of the annular cavity for further preventing movement of the epoxy or like sealant plug in the axial direction.

The present invention is also directed to a method of making an optical feedthrough assembly, including the following steps: (a) forming the annular cavity of the tubular member with a predetermined width between the optical fiber and the annular surface to allow the epoxy or other sealant in its liquid phase to substantially fill the annular cavity by capillary action; (b) selecting a polymeric or other type of sealant capable of exhibiting a viscosity which allows the sealant to substantially fill the annular cavity by capillary action, and also capable of exhibiting a viscosity which substantially prevents leakage of the sealant out of the ends of the annular cavity upon filling the cavity; (c) introducing the polymeric or other sealant in its liquid phase into the annular cavity and allowing the sealant to substantially fill the annular cavity by capillary action; and (d) wherein upon filling the annular cavity, the polymeric or like sealant transitions to its solid phase and adhesively secures the fiber within the optical feedthrough cavity, and substantially prevents movement of the solid epoxy or sealant plug out of the cavity.

One advantage of the method and assembly of the present invention is that they are capable of providing an optical feedthrough assembly with minimal leakage and high longevity in relatively high pressure, high temperature and other harsh environments.

Another advantage of the method and assembly of the present invention is that they enable the use of polymeric or like sealants having low elastic moduli to thereby significantly improve the resistance of the glass fiber to damage and breakage. Epoxies or like sealants further provide a natural strain relief at the interface between the glass fiber and the feedthrough assembly at the points where the fiber enters and exits the feedthrough. Accordingly, the feedthrough assemblies of the present invention may exhibit significantly lower stress concentrations and improved survivability in comparison to the prior art feedthroughs described above.

Another advantage of the method and assembly of the present invention is that they enable the use of a polymeric or like sealant having a relatively low elastic modulus to minimize any thermal stress at the interface of the optical fiber or like waveguide and feedthrough assembly. As a result, the present invention substantially avoids the problems encountered in the above-described prior art feedthroughs wherein significant thermal stresses are created at the interfaces of the optical fibers and feedthroughs due to the extremely low rate of thermal expansion of the optical fiber material in contrast to the adjoining material of the prior art feedthroughs.

A further advantage of the method and assembly of the present invention is that the feedthrough assembly may form a continuous (or uninterrupted) fiber or like waveguide path from one end of the assembly to the other. As a result, there is essentially zero light attenuation when using, for example, single mode fiber with a high numerical aperture (NA). Such high NA single mode fiber, sometimes called 'bend-insensitive' fiber, is typically used in Bragg grating-based optical fiber sensors employed in oil and gas exploration and production, where the low light attenuation properties of the fiber are particularly useful in such systems having sensors located at great distances from the light source which interrogates the sensor.

These and other objects and advantages of the present invention will become readily apparent in view of the following detailed description of preferred embodiments and accompanying drawings

BEST MODE FOR CARRYING OUT THE INVENTION

Figure 1:
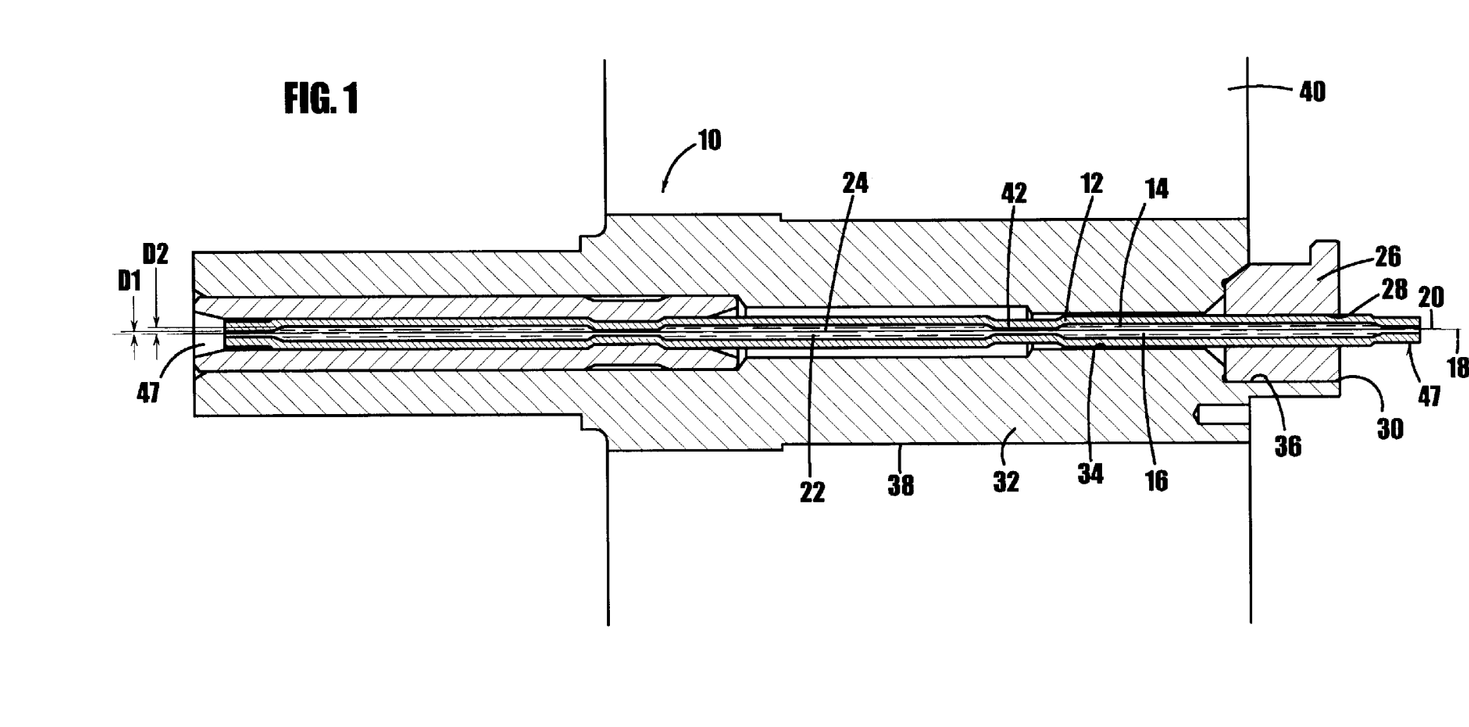
FIG. 1 is a cross-sectional view of an optical waveguide feedthrough assembly embodying the present invention.
Figure 2:
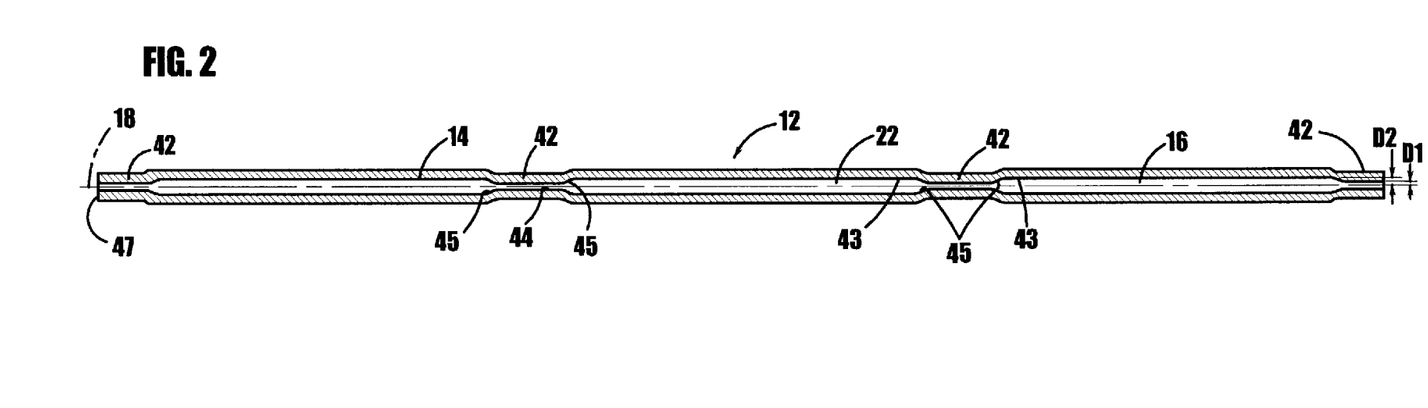
FIG. 2 is a cross-sectional view of the tubular member of the feedthrough assembly of FIG. 1 for receiving therethrough at least one optical waveguide.

In FIG. 1, an optical waveguide feedthrough assembly embodying the present invention is indicated generally by the reference numeral 10. As shown in FIGS. 1 and 2, the feedthrough assembly 10 comprises a feedthrough body or tubular member 12 defining an axially elongated, annular surface 14 extending from approximately one end of the tubular member to the other, and an optical feedthrough cavity 16 formed within the annular surface. The annular surface 14 and feedthrough cavity 16 define an elongated axis 18. As shown in FIG. 1, at least one optical waveguide 20 is received through the feedthrough cavity 16, and is spaced radially inwardly relative to the annular surface 14 to thereby define an axially elongated annular cavity 22 between the optical waveguide 20 and annular surface 14 and extending from one end of the tubular member 12 to the other.

A flowable adhesive or sealant 24, such as a polymeric sealant as will be more fully described herein below, is received within the annular cavity 22, surrounds the optical waveguide 20, and substantially fills the annular cavity 22 from approximately one end of the tubular member 14 to the other. As described further below, the sealant 24 exhibits liquid and solid phases, and is introduced in its liquid phase into one end of the annular cavity 22 and fills the annular cavity by capillary action. Then, the sealant 24 transitions from its liquid to its solid phase, and exhibits adhesive properties at the interfaces of the sealant and both the annular surface 14 and waveguide 20, to adhesively secure and hermetically seal the waveguide within the tubular member.

The feedthrough assembly 10 farther comprises a first support 26 defining a first mounting surface 28 formed therethrough for receiving one end of the tubular member 12, and a second mounting surface 30 formed along the outer periphery of the first support. A second support 32 defines an elongated aperture 34 for receiving therethrough the tubular member 12, and a mounting recess 36 formed at one end of the support for receiving and fixedly securing thereto the first support 26. The second support 32 defines an external mounting surface 38 for mounting the optical feedthrough assembly 10 within a feedthrough member 40 in a conventional manner, such as a metal-to-metal seal, o-ring seal, or weldment.

As shown best in FIG. 2, the annular surface 14 defines an inner dimension (which also defines the outer dimension of the optical feedthrough cavity 16) having at least one variation along the axial direction thereof, which, as described further below, cooperates with the sealant 24 to substantially prevent movement of the sealant and optical waveguide relative to the annular surface. In the illustrated embodiment, the inner dimension of the annular surface 14, and the outer dimension of the optical feedthrough cavity 16, is the diameter "D", and as can be seen, the diameter varies along the axial direction between the diameter "D1" and the diameter "D2". As also shown in FIG. 2, in the illustrated embodiment, the tubular member 12 defines a plurality of radially inwardly projecting interruptions 42 in the annular cavity 22 and axially spaced relative to each other that define the variations in the diameter "D". The radially projecting interruptions 42 are defined by first surface areas shown typically at 43, and contiguous second surface areas shown typically at 44 that are spaced radially inwardly relative to the first surface areas. In the illustrated embodiment of the present invention, the radially projecting interruptions 42 are formed by radially crimping the tubular member 12 over a gage pin (not shown). As may be recognized by those skilled in the pertinent based on the teachings herein, numerous other techniques equally may be employed for creating the radially inwardly projecting interruptions, such as by employing a premolded tubular member. In addition, the outer surface of the tubular member may be uniform and need not include dimensional variation. As also shown best in FIG. 2, transition regions shown typically at 45 extend between the first and second surface areas 43 and 44, respectively, and define smooth or rounded surfaces. As described further below, the rounded transition regions 45 promote the flow of sealant 24 throughout the annular cavity 22 in a substantially laminar manner to thereby define a substantially voidless layer of sealant.

One advantage of the radial projections 42 is that upon filling the annular cavity 22 with the sealant 24, and transitioning the sealant to its solid phase, the radial projections cooperate with the sealant to further prevent axial movement of the solid sealant plug and/or waveguide 20 in the axial direction. In high-pressure applications, the pressure applied to the sealant 24 at the high-pressure end of the assembly tends to force the sealant axially within the tube. If sufficient, the high pressure could over time break the adhesive bond between the sealant and annular surface of the tube and, in turn, force or extrude the sealant through the tube. However, the radial projections 42 (or like dimensional variations) provide a mechanical resistance to extrusion of the sealant out the low-pressure end of the feedthrough assembly, thereby providing an additional safety factor to the adhesive bonds. In addition, the radial projections 42 of the tubular member provide mechanical holding to prevent movement of the sealant plug in either the high or the low-pressure directions due to applied thermal and/or pressure cycles.

As may be recognized by those skilled in the pertinent art based on the teachings herein, the feedthrough assembly of the present invention may employ one or more such radially projecting interruptions or like dimensional variations, and the interruptions or like dimensional variations may take any of numerous different shapes or configurations. For example, rather than have the second surface portions 44 project radially inwardly, one or more of these surface portions may project radially outwardly relative to the contiguous second surface portion 43. In addition, the radially projecting surface portions need not extend annularly about the optical waveguide 20, but rather may extend over a more limited, or different surface area. For example, the radially projecting interruptions may be defined by one or more dimples or discrete protuberances formed on the annular surface 14. Alternatively, the radially projecting interruptions may be formed by discrete members fixedly secured to the annular surface, or otherwise projecting radially inwardly relative to the annular surface. Those skilled in the pertinent art may further recognize based on the teachings herein that the axially-elongated, annular surface 14 need not define a circular cross-sectional configuration, but rather may define any of numerous different shapes and/or configurations without departing from the scope of the present invention.

At the high-pressure end 47 of the feedthrough assembly 10, the sealant 24 is subjected to high-pressure fluid over its exposed end face. The force per unit area applied by such high-pressure fluid to the end face is a function of the outside diameter of the sealant 24 (or the diameter or other dimension defining the optical feedthrough cavity 16). Accordingly, as the outside diameter of the sealant 24 (or the diameter of the annular surface 14 or feedthrough cavity 16) is reduced, the reduction in total force applied by the high pressure fluid to the end face of the sealant 24 is a function of the diameter squared (or is a function of the circumference of the bond line to the annular surface 14 to the first power). Accordingly, as shown in FIGS. 1 and 2, for relatively high pressure applications, a radially projecting interruption 42 is formed on at least the high pressure end 47 of the tubular member 12 to thereby reduce the outer diameter of the sealant 24 and, in turn, minimize the forces applied to the sealant in the axial direction. As shown best in FIG. 2, an embodiment of the tubular member 12 includes radially projecting interruptions 42 at both ends. The tubular member is similar to that disclosed in the aforementioned U.S. patent application Ser. No. 09/628,264, filed contemporaneously herewith, the disclosure of which is hereby incorporated by reference in it's entirety.

In an embodiment of the present invention, the sealant 24 is an epoxy capable of withstanding temperatures within the range of about 150° C. to about 250° C. and capable of exhibiting a viscosity within the range of about 3,000 centipoises through about 85,000 centipoises. In addition, the epoxy 24 in a certain embodiment is a 100% solids epoxy. Epoxies that are approximately 100% solids do not expel solvents or volatiles during cure, and therefore create a substantially void-free epoxy layer filling the annular cavity 22 from one end of the tubular member 12 to the other. Other epoxies may be used, depending on the particular application; however, epoxies that are not 100% solids may contain volatile compounds or solvents that escape or evaporate during cure. Thus, if such epoxies are employed in the apparatus of the present invention, any such volatiles might expand during cure and expel some or all of the epoxy within the tubular member 12. As a result, voids would likely remain within the annular cavity 22. Any such voids could, in turn, create non-axisymmetric stress fields, leading to high fiber stress, power attenuation in the fiber due to fiber bending, and collapse of one or more of the voids due to applied high pressures.

For long term service with high reliability, the sealant 24, such as the epoxies described above, exhibit a glass transition temperature that is significantly above the service temperature of the feedthrough assembly. One such sealant is an anhydride cure epoxy manufactured by Aremco Inc. under the designation "526N". The glass transition temperature of this epoxy is approximately 160° C. In addition, the viscosity of this epoxy at room temperature is approximately 85,000 centipoises, which, when employed in the present invention, is sufficiently high to prevent capillary action from drawing the epoxy through the annular cavity 22 without first lowering the viscosity by preheating the tubular member 12 and optical waveguide 20, as described further below.

As may be recognized by those skilled in the pertinent art based on teachings herein, the sealant 24 may take the form of any of numerous different sealants that are currently known or later become known for performing the functions of the sealant 24. For example, the sealant may take the form of any of numerous different polymeric sealants, such as any of numerous different epoxies or other thermoset resins, and such sealants may include fillers or other agents for obtaining the desired physical characteristics of the sealant for a particular application. For relatively high pressure and/or high temperature environments, such as for use in oil or gas wells, the sealant is preferably capable of withstanding continuous temperatures of at least 150° C., and continuous pressures of at least 15 kpsi, and most preferably is capable of withstanding continuous temperatures within the range of about 150° C. to about 175° C., and continuous pressures within the range of about 15 kpsi to about 20 kpsi. In addition, the preferred sealant for such applications is at such temperatures and/or pressures capable of resisting creep (i.e., material flow) and softening, and also is capable of maintaining the adhesive bond between the sealant and annular surface 14 and between the sealant and outer surface of the optical waveguide, such as the buffer layer of an optical fiber.

As also may be recognized by those skilled in the pertinent art based on the teachings herein, the optical waveguide 20 may be any of numerous different devices that are currently or later become known for conducting optical signals along a desired pathway. Accordingly, the optical waveguide 20 may include, for example, an optical fiber (such as a standard telecommunication single mode optical fiber), an optical fiber having a Bragg grating impressed (or embedded or imprinted) in the fiber, or any of numerous other types of optical waveguides, such as multi-mode, birefringent, polarization maintaining, polarizing, multi-core or multi-cladding optical waveguides, or flat or planar waveguides, any of which may be referred to as an optical fiber herein. In addition, the feedthrough assembly 10 may include a single such waveguide as shown in FIG. 1, or may include a plurality of such waveguides.

As also may be recognized by those skilled in the pertinent art based on the teachings herein, the body or tubular member 12 may be formed of any of numerous different materials that are currently or later become known for performing one or more of the functions of the tubular member (and annular surface) described herein. For high pressure and/or high temperature applications, the tubular member preferably exhibits high strength, corrosion resistance, temperature and pressure stability, and predictably induced plastic deformation. In an embodiment of the present invention, the tubular member 12 is formed of an annealed nickel alloy, such as the alloy sold by Inco Alloys International, Inc. under the mark "Iconel 600". However, as indicated above, any of numerous other materials may be suitable for the tubular member, such as stainless steel, other nickel-based alloys, including Incoloy® and Nimonic® (registered trademarks of Inco Alloys International, Inc.), carbon, chromium, iron, molybdenum, and titanium (e.g., Inconel 625). In addition, the tubular member 12 (or other structure forming the annular surface 14) may take any of numerous different shapes or configurations. For example, rather than a circular cross-sectional configuration, the tubular member or annular surface may have a square, rectangular, oval, elliptical, clam-shall or other desired shape.

In accordance with the method of the present invention, the feedthrough assembly 10 is manufactured in accordance with the following steps: (a) The annular cavity 22 is formed with a predetermined minimum width "D" (FIG. 1) between the optical waveguide 20 and the annular surface 14 to allow the sealant 24 in its liquid phase to substantially fill the annular cavity by capillary action; (b) A sealant 24 is selected which is capable of exhibiting a viscosity which allows the sealant to substantially fill the annular cavity 22 by capillary action, and also is capable of exhibiting a viscosity which substantially prevents leakage of the sealant out of one or both ends of the annular cavity upon substantially filling the cavity. (c) Then, the sealant 24 is introduced in its liquid phase into the annular cavity, and is allowed to substantially entirely fill the annular cavity by capillary action. Although the sealant may be introduced into the annular cavity at either end, in a current embodiment, the sealant is introduced at the high pressure end 47. (d) Upon filling the annular cavity 22, the sealant 24 transitions to its solid phase and adhesively secures the optical waveguide 20 within the optical feedthrough cavity 16, and substantially prevents movement of the sealant and the optical waveguide relative to the annular surface 14.

With the epoxy or like polymeric sealants of the present invention, the annular surface 14 and optical waveguide 20 are preheated to a predetermined elevated temperature prior to introducing the epoxy into the annular cavity. The annular surface and waveguide are heated to the first stage cure temperature of the epoxy. Then, the epoxy is introduced into one end of the cavity and heated to its first stage cure temperature upon contacting the preheated annular surface 14 and optical waveguide 20. This, in turn, reduces the viscosity of the epoxy to facilitate filling the annular cavity at a relatively rapid rate by capillary action.

One important step in the method of this embodiment is to select an adhesive or epoxy with a viscosity within a range that is low enough to allow it to be drawn by capillary action into the annular cavity 22, with or without lowering the viscosity by preheating, within a reasonable period of time. For example, if heat is applied to lower the viscosity prior to filling, but the viscosity is still too high for reasonably rapid filling, the epoxy may begin to harden and cure prior to filling the cavity and may thereby prevent complete filling of the cavity. Alternatively, if the viscosity of the epoxy is too low, the epoxy may not remain contained within the annular cavity 22 for a long enough time for curing to begin. As a result, the epoxy may leak out of the annular cavity 22 and cause an incomplete fill.

As described above, in the current embodiment of the present invention, an epoxy or other sealant capable of exhibiting a viscosity within the range of about 3,000 centipoises to about 85,000 centipoises has proven to be effective in manufacturing the optical feedthrough assemblies in accordance with the present invention. In one embodiment, the tubular member 12 defines a nominal inside diameter of about 0.022 inches, the overall length of the tubular member 12 is about 2.0 inches, the outside diameter of the fiber 20 over the buffer is about 0.006 inches, and the epoxy exhibits a viscosity in the range of about 3,000 centipoises to about 85,000 centipoises. In this embodiment, the diameter D2 is preferably within the range of about 0.015 to about 0.030 inch, and most preferably within the range of about 0.020 to about 0.025 inch. When the tubular member 12 and optical fiber 20 are preheated to about 90° C., the annular cavity 22 can be filled by capillary action in less than approximate five (5) minutes. Preferably, the maximum width "D2" (FIG. 1) of the annular plug of sealant 24 is no more than approximately twice the diameter of the optical waveguide(s) 20 (or maximum width) in order to fill the annular cavity by capillary propagation (or "wicking").

Also in accordance with this embodiment of the present invention, the tubular member 12 is first assembled to the first support 26 and second support 32 prior to introducing the sealant 24 into the annular cavity 22. First, the first support 26 is fixedly secured to the high-pressure end of the tubular member 26 using a technique such as laser welding, which allows precise welding of relatively thin cross sectional parts like the tubular member 12. As shown in FIG. 1, the first support 26 is in the form of a cylinder; however, as may be recognized by those skilled in the pertinent art based on the teachings herein, the first support may take any of numerous other shapes or configurations. The first support/tubular member assembly (26, 12) is then fixedly secured to the second support 32 by, for example, welding, such as electron beam welding.

Next, the optical waveguide or fiber 20 is installed concentrically within the tubular member 12 with relatively high precision, typically within a true position of about 0.001 inches. One particularly versatile method of the invention that will accommodate geometry variations in the tubular member and/or waveguide is to utilize a high-precision, three-axis translation stage (not shown) of a type known to those of ordinary skill in the pertinent art on each end of the tubular member 12. Proper adjustment of these stages, while maintaining mild tension on the optical fiber sufficient to keep it straight, will align the fiber concentrically within the metal tube. A significant advantage of the approximately concentric alignment of the waveguide or fiber with the annular surface is that it provides an axisymmetric stress field on the fiber during epoxy curing, and during subsequent thermal and fluid pressure loading.

Turning to FIG. 3, an optical sensing assembly employing the optical waveguide feedthrough 10 of the present invention is indicated generally by the reference numeral 50. The sensing assembly of FIG. 3 is of the type disclosed in the aforementioned co-pending U.S. patent application Ser. No. 09/628,264.

As shown in FIG. 3, the sensing assembly 50 comprises an optical sensor 52 disposed within a volume 54 partially defined by a sensor housing 56 that is filled with a viscous fluid 58 to essentially "float" the sensor within the sensor housing. The viscous fluid 58 "floats" sensor element 52 within sensor housing 56 providing fluid dampening to the sensor and allowing for uniform pressure distribution about the sensor. The sensor 52 may be any of numerous different types of optical sensors, such as pressure, temperature and/or force sensors, that benefit from shock and vibration protection. For example, the sensor 52 may be a pressure sensor of the type described in one or both of the above-mentioned U.S. Patent applications. In the case of a fiber optic based sensor element 52, waveguide 20 may be comprised of one or more fiber optic cables.

Sensing assembly 50 further comprises a pressure transmission device 60, such as a bellows, disposed within a pressure housing 64 and in fluid communication with volume 54. Pressure transmission device 60 is exposed to a viscous fluid 65, which may be the same or different than viscous fluid 58, having a pressure P1 entering the pressure housing 64 through an inlet 66 from a source (not shown). Pressure transmission device 60 reacts to pressure P1 in the direction indicated by arrow 61 and produces a corresponding pressure P2 within volume 58. Pressure P2 is a quasi-hydrostatic pressure that is distributed about pressure sensor 52 enabling the accurate determination of PI. In certain embodiments, fluid 65 comprises those fluids typically encountered within an oil production well, including oil, gas, water and air, among others. Sensor housing 56 is filled with a fluid such as a viscous fluid, grease, silicone oil, or other fluids that provide shock and/or vibration isolation and prevent the sensor 52 from violently contacting the inner walls of the housing when subject to shock or vibration. Pressure transmission device 60 is coupled to volume 54 in such a way as to transmit the pressure P1 to volume 54 wherein there will be a corresponding pressure P2 sensed by the pressure sensor 52. Further, pressure transmission device 60 may be configured to maintain fluid 58 in a relatively void free condition, but in any event maintains a minimum pressure within volume 54 and retains sensor 52 in a suspended or floating position as described above. The maintenance of this fluid filled, void free condition is also useful to protect the sensor 52 from shock and vibration during shipping, deployment, and handling.

The viscous fluid 54 isolates the sensor 52 from shock or vibration induced to the sensor assembly 50 by maintaining an average gap 68, thereby decoupling the sensor 52 from the housing 56. By decoupling the sensor 52 from the housing 56, the sensor assembly 50 virtually eliminates base strain from the housing, and in turn achieves essentially a zero base strain sensitivity. Pressure sensor 52 is exposed to pressure P2 and transmits a signal corresponding to the level of pressure of fluid 58 via optical waveguide 20. In order to insure that the sensor 52 is free to float within housing 56, optical waveguide 20 may be provided with a strain relief, or flexure portion 70 which creates a low stiffness attachment between the sensor element 52 and its base structure, the housing 56.

As shown in FIG. 3, the optical waveguide feedthrough assembly 10 of the present invention is mounted within an end wall of the housing 56, and the optical wave guide (or transmission cable) 20 exits the housing through the feedthrough 10 and, in turn, is routed to other sensors or to an instrumentation or interrogation system (not shown).

In the operation of the sensor assembly 50, a change in source pressure P1 causes bellows 60 to react in the direction of arrow 61, thereby changing the internal volume of the bellows and the pressure P2 within volume 58. An increase in pressure P1 decreases the internal volume of bellows 60 and increases the sensed pressure P2, and likewise a decrease in source pressure P1 increases the internal volume of the bellows 60 thereby decreasing the sensed pressure P2. Bellows 60 has a maximum extension volume that maintains viscous fluid 54 at a predictable minimum quasi-hydrostatic pressure P2 suspending sensor 52 within volume 58 with average gap 68 between the sensor and sensor housing 56.

Although the exemplary sensing assembly of FIG. 3 employs only a single optical waveguide feedthrough assembly 10, other sensing assemblies or systems requiring optical waveguide feedthroughs may employ a plurality of such waveguide feedthroughs in any of a plurality of different configurations. For example, a single optical waveguide 20 may enter a sensor housing at one end through a first feedthrough assembly 10, and exit the sensor housing at another end (or the same end) through a second feedthrough assembly 10. Similarly, a single optical waveguide 20 may enter a sensor housing through a feedthrough assembly 10, and exit the housing by doubling back through the same feedthrough assembly.

In some cases, the waveguide 20 may include an external buffer, particularly in the region where the waveguide passes through the feedthrough assembly, wherein the buffer is made of a material to which it is difficult to create a strong and reliable adhesive bond, such as polyamide or Teflon®. A relatively weak bond of this type could cause an eventual failure of the feedthrough assembly by fluid leakage along the interface, and/or by allowing movement of the waveguide 20 relative to the tubular member 12 due to complete adhesive bond failure. In order to overcome this deficiency, an alternative embodiment of the present invention involves removing the waveguide or fiber buffer locally over a fraction of the length of the fiber passing through the feedthrough assembly to expose the underlying optical glass surface. Then, the exposed optical glass surface is treated with an adhesion promoter, such as silane. The epoxy adhesive or other sealant 24 is then introduced by capillary action into the annular cavity 22 in the manner described above. Alternatively, the silane or other adhesion promoter can be pre-mixed with the epoxy adhesive in a manner known to those of ordinary skill in the pertinent art.

In addition to treating the glass for improving the epoxy-to-glass bond (or other sealant-to-glass bond), the annular surface 14 of the tubular member 12 may be treated in a like manner to improve the epoxy-to-metal bond (or other sealant-to metal bond). However, the improvement in the epoxy-to-metal bond achieved with such treatment is typically not as great as is seen with the epoxy-to-glass bond. In one embodiment, silane sold under the mark "A-1100" and manufactured by Witco Corp. of Greenwich, Conn. is employed. However, as may be recognized by those skilled in the pertinent art based on the teachings herein, any of numerous other adhesion promoters, or methods for promoting adhesion, which are currently known or later become known for performing the function of the adhesion promoter described herein, may be employed.

One advantage of the present invention is that the feedthroughs disclosed are resistant to creep and/or extrusion along the elongated axis of the optical fiber, and therefore are capable of exhibiting significantly improved service lives in comparison to the prior art feedthroughs described above.

Another advantage of the present invention is that the axial length of the feedthrough is sufficiently long to provide a sufficient margin of safety, such that some gradual degradation or failure of the adhesive bond can occur without causing fluid leakage through the feedthrough, or movement of the fiber relative to the tubular member. In accordance with certain embodiments of the present invention, the overall length of the annular cavity 22 preferably is at least approximately 50 times the diameter D2 of the annular surface 14 (or if the annular surface defines a cross sectional shape other than circular, the length is preferably 50 times the width of the feedthrough cavity 16), and most preferably this ratio is at least 100:1.

A significant advantage of the present invention over existing optical waveguide feedthroughs is that the feedthrough assembly of the invention provides for essentially zero optical loss with certain fiber types, such as single mode, high numerical aperture 'bend-insensitive' fiber, due to the continuous fiber path through the feedthrough, and the use of low elastic modulus epoxy adhesives or other sealants surrounding the fiber which create low micro-bending losses.

Another advantage of the present invention is the ease of manufacture, due to the lack of need to create a 'break' in an otherwise continuous fiber, which would require terminating the fiber in some way which is usually expensive, labor intensive, and subject to loss or scrapping of valuable optical components which may be integrally attached to this fiber 'pigtail'.

The feedthrough assembly of the present invention achieves these advantages while maintaining high reliability for long term service at very elevated temperatures and pressures. Another significant advantage of the present invention is the ability to fill the annular cavity between the tubular member and optical waveguide or fiber completely using capillary action. Injection of epoxy or other sealant by conventional means, on the other hand, into such a small volume is essentially impossible, and injection into large volumes is subject to the formation of voids in the epoxy or other sealant, which can, in turn, create non-axisymmetric stresses on the fiber due to applied pressure and temperature, leading to failure due to fluid leakage and/or fiber breakage.

It should be understood that the dimensions, geometries, and materials described for the embodiments disclosed herein are for illustrative purposes and as such, any other dimensions, geometries, or materials may be used if desired, depending on the application, size, performance, manufacturing or design requirements, or other factors, in accordance with the teachings herein. For example, the axially-elongated surface 14 may be defined by the feedthrough member, such as the bulkhead itself, and need not be defined by a separate tubular member of other body of the feedthrough assembly. In addition, numerous changes and modifications may be made to the above described and other embodiments of the present invention without departed from the scope of the invention as defined in the appended claims. It should also be understood that any of the features, characteristics, alternatives or modifications described regarding a particular embodiment herein may also be applied, used, or incorporated with any other embodiment described herein. Accordingly, this detailed description of preferred embodiments is to be taken in an illustrative, as opposed to a limiting sense.

What is claimed is:

1. An optical waveguide feedthrough assembly for passing at least one optical waveguide through a feedthrough member, comprising:

at least one axially elongated surface defining an axially elongated optical feedthrough cavity, wherein the optical feedthrough cavity is defined by an outer dimension having at least one variation along the axial direction thereof;

at least one optical waveguide received through the axially-elongated optical feedthrough cavity, and spaced relative to the axially-elongated surface to thereby define an axially elongated space between the at least one optical waveguide and axially elongated surface and extending from approximately one end of the optical feedthrough cavity to approximately another end thereof; and a sealant received within the cavity and extending between the at least one optical waveguide and the axially-elongated surface, and extending axially within the cavity from approximately one end to approximately another end thereof substantially entirely throughout the axially elongated space between the at least one optical waveguide and axially elongated surface, wherein the sealant exhibits adhesive properties at the interface of the sealant and the at least one optical waveguide, and at the interface of the sealant and the axially-elongated surface, to secure the at least one optical waveguide within the optical feedthrough cavity, and wherein the sealant cooperates with the at least one variation in the outer dimension defining the cavity to substantially prevent axial movement of the sealant relative to the axially-elongated surface.

2. An optical waveguide feedthrough assembly as defined in claim 1, wherein the axially-elongated surface defines an annular surface, and an axially-elongated annular cavity between the at least one optical waveguide and the axially-elongated surface.

3. An optical waveguide feedthrough assembly as defined in claim 1, wherein the sealant is a polymeric sealant.

4. An optical waveguide feedthrough assembly as defined in claim 1, wherein the axially-elongated surface defines at least one first surface area and contiguous second surface area spaced radially inwardly relative to the first surface area, and wherein the first and second surface areas form the at least one variation in the outer dimension defining the optical feedthrough cavity for preventing axial movement of the polymeric sealant relative to the annular surface.

5. An optical waveguide feedthrough assembly as defined in claim 4, wherein the second surface area defines an annular surface area extending around the at least one optical waveguide.

6. An optical waveguide feedthrough assembly as defined in claim 4, wherein the axially-elongated surface defines a plurality of first surface areas spaced relative to each other in the axial direction of the optical feedthrough cavity, and a plurality of contiguous second surface areas spaced radially inwardly relative to the respective first surface areas for preventing axial movement of the polymeric sealant relative to the annular surface.

7. An optical waveguide feedthrough assembly as defined in claim 4, further defining at least one transition region between the first and second contiguous surface areas, and wherein the at least one transition region forms a rounded surface for facilitating the flow of sealant through the cavity upon introduction of the sealant into the cavity.

8. An optical waveguide feedthrough assembly as defined in claim 1, wherein the axially elongated surface is defined by at least one tubular member.

9. An optical waveguide feedthrough assembly as defined in claim 8, further comprising a first support mountable within the feedthrough member and defining a first mounting surface for receiving and supporting the tubular member within the feedthrough member.

10. An optical waveguide feedthrough assembly as defined in claim 9, further comprising a second support defining an elongated aperture for receiving therethrough the at least one tubular member, and a second mounting surface for receiving and supporting the first support thereon, wherein the second support is mountable within the feedthrough member for fixedly mounting the assembly to the feedthrough member and forming a hermetic seal at the interface of the second support and feedthrough member.

11. An optical waveguide feedthrough assembly as defined in claim 1, wherein the at least one optical waveguide and axially-elongated surface are approximately concentric.

12. An optical waveguide feedthrough assembly as defined in claim 1, wherein the axially-elongated surface defines at least one approximately cylindrical portion.

13. An optical waveguide feedthrough assembly as defined in claim 3, wherein the polymeric sealant is an epoxy.

14. An optical waveguide feedthrough assembly as defined in claim 1, wherein the sealant is capable of exhibiting a liquid phase and a solid phase, and in the liquid phase the sealant exhibits a viscosity within the range of approximately 3,000 centipoises through approximately 85,000 centipoises.

15. An optical waveguide feedthrough assembly as defined in claim 1, wherein the sealant exhibits a liquid phase and a solid phase, and the cavity defines a width extending between the at least one optical waveguide and the axially-elongated surface sufficient to allow the sealant in its liquid phase to fill the cavity from approximately one end to approximately the other end thereof by capillary action.

16. An optical waveguide feedthrough assembly as defined in claim 1, wherein the sealant exhibits a liquid phase and a solid phase, and in its solid phase is substantially free of voids.

17. An optical waveguide feedthrough assembly as defined in claim 14, wherein the sealant is approximately 100% solids.

18. An optical waveguide feedthrough assembly as defined in claim 1, wherein the sealant forms a hermetic seal between the at least one optical waveguide and the axially-elongated surface.

19. An optical waveguide feedthrough assembly as defined in claim 1, wherein the at least one optical waveguide is an optical fiber.

20. At least one optical waveguide feedthrough assembly as defined in claim 1 in combination with an optical sensor assembly, wherein the optical sensor assembly includes a housing, a sensor cavity formed within the housing, and an optical sensor located within the housing, and wherein the feedthrough member of the at least one optical feedthrough assembly is defined by a wall of the housing.

21. At least one optical waveguide feedthrough assembly and optical sensor assembly as defined in claim 20, comprising at least one optical pressure sensor and at least one optical temperature sensor optically coupled to the optical waveguide of the optical waveguide feedthrough assembly.

22. An optical waveguide feedthrough assembly as defined in claim 1, having a relatively high pressure side at one end of the optical feedthrough cavity, and a relatively low pressure side at the opposite end of the optical feedthrough cavity, and wherein the axially-elongated surface defines a first annular portion located at the high pressure side and defining a first width, and a second annular portion spaced axially inwardly relative to the first annular portion and defining a second width, wherein the first width is less than the second width to thereby minimize forces applied to the sealant at the high pressure side of the assembly.

23. An optical waveguide feedthrough assembly as defined in claim 1, wherein the cavity defines a width in a radial direction between the at least one optical waveguide and the axially-elongated surface, and defines a length in the axial direction from approximately one end of the axially-elongated surface to the other, and wherein the length of the cavity is at least approximately 50 times the width.

24. An optical waveguide feedthrough assembly as defined in claim 23, wherein the axis of the cavity is defined by a straight line.

25. An optical waveguide feedthrough assembly as defined in claim 1, further comprising a hollow, elongated member mountable within the feedthrough member and defining a first opening, a second opening axially spaced relative to the first opening, and the at least one axially elongated surface extending between the first and second openings and defining the axially elongated optical feedthrough cavity therebetween, and wherein the sealant extends throughout the axially elongated space between the at least one optical waveguide and the axially elongated surface from approximately the first opening to approximately the second opening of the hollow, elongated member.

26. An optical waveguide feedthrough assembly for passing at least one optical waveguide through a feedthrough member, comprising:
    at least one axially elongated surface defining an axially elongated optical feedthrough cavity;
    at least one optical waveguide received through the axially-elongated optical feedthrough cavity, and spaced relative to the axially-elongated surface to thereby define an axially elongated space between the at least one optical waveguide and axially elongated surface and extending from approximately one end of the optical feedthrough cavity to approximately another end thereof;
    first means received within the optical feedthrough cavity and extending within the cavity between the at least one optical waveguide and the axially-elongated surface, and extending axially within the cavity from approximately one end to approximately another end thereof substantially entirely throughout the axially elongated space between the at least one optical waveguide and axially elongated surface, for adhesively securing and hermetically sealing the at least one optical waveguide within the cavity; and
    second means for preventing movement of the first means in the axial direction relative to the axially-elongated surface.

27. An optical waveguide feedthrough assembly as defined in claim 26, wherein the second means includes at least one first surface area formed on the axially-elongated surface, at least one contiguous second surface area spaced radially inwardly relative to the first surface area on the axially-elongated surface, and at least one transition surface area formed between the first and second surface areas, and wherein the first, second and transition surface areas adhesively engage the first means to prevent axial movement of the first means.

28. An optical waveguide feedthrough assembly as defined in claim 27, wherein the second surface area forms an annular constriction within the cavity.

29. An optical waveguide feedthrough assembly as defined in claim 26, wherein the first means includes a tubular body forming the axially-elongated surface.

30. An optical waveguide feedthrough assembly as defined in claim 26, wherein the at least one optical waveguide and axially-elongated surface are approximately concentric.

31. An optical waveguide feedthrough assembly as defined in claim 26, wherein the second means includes a sealant substantially filling the cavity.

32. An optical waveguide feedthrough assembly as defined in claim 31, wherein the sealant exhibits a liquid phase and a solid phase, and the assembly further comprises means for allowing the sealant in its liquid phase to fill the cavity from approximately one end to approximately the other end thereof by capillary action.

33. At least one optical waveguide feedthrough assembly as defined in claim 26 in combination with an optical sensor assembly, wherein the optical sensor assembly includes a housing, a sensor cavity formed within the housing, and an optical sensor located within the housing, and wherein the feedthrough member is defined by a wall of the housing.

34. An optical waveguide feedthrough assembly as defined in claim 26, having a relatively high pressure side at one end of the optical feedthrough cavity, and a relatively low pressure side at the opposite end of the optical feedthrough cavity, and including means for reducing the forces applied to the first means at the high pressure side of the optical feedthrough cavity.

35. An optical waveguide feedthrough assembly as defined in claim 34, wherein the means for reducing the forces applied to the first means includes the axially-elongated surface defining a first annular portion located at the high pressure side and defining a first width, and a second annular portion spaced axially inwardly relative to the first annular portion and defining a second width, wherein the first width is less than the second width to thereby reduce the forces applied to the first means at the high pressure side of the assembly.

36. A method of making an optical waveguide feedthrough assembly including a feedthrough member for receiving therethrough at least one optical waveguide, an axially-elongated surface defining therein an axially elongated optical feedthrough cavity, at least one optical waveguide received within the cavity, and a sealant exhibiting a liquid phase and a solid phase and received within the cavity for adhesively securing the at least one optical waveguide within the cavity, said method comprising the steps of:
    forming the cavity with a predetermined width between the at least one optical waveguide and the axially-elongated surface to allow the sealant in its liquid phase to substantially fill the cavity by capillary action;
    selecting a sealant capable of exhibiting a viscosity which allows the sealant to substantially fill the cavity by capillary action, and capable of exhibiting a viscosity which substantially prevents leakage of the sealant out of at least one end of the cavity upon substantially filling the cavity; and
    introducing the sealant in its liquid phase into the cavity and allowing the sealant to substantially fill the cavity by capillary action;
    wherein upon substantially filling the cavity, the sealant transitions to its solid phase and adhesively secures the at least one optical waveguide within the cavity and substantially prevents movement of the sealant and the at least one optical waveguide relative to the axially-elongated surface.

37. A method as defined in claim 36, further comprising the step of forming at least one radially projecting interruption in the cavity to further prevent axial movement of the sealant.

38. A method as defined in claim 36, further comprising the steps of preheating at least one of the axially-elongated surface and at least one optical waveguide to a predetermined elevated temperature, introducing the liquid sealant into the cavity and heating the sealant upon contacting at least one of the axially-elongated surface and at least one optical waveguide and, in turn, reducing the viscosity of the sealant to facilitate filling the cavity by capillary action.

39. A method as defined in claim 38, wherein the sealant includes an epoxy, and the predetermined elevated temperature is at least the approximate first stage cure temperature of the epoxy.

40. A method as defined in claim 36, further comprising the step of positioning the at least one optical waveguide approximately concentric with the axially-elongated surface within the optical feedthrough cavity.

41. A method as defined in claim 40 wherein the axially-elongated surface is defined by a tubular body, and the positioning step includes mounting at least one end of the tubular body to a multi-axis translation stage, applying tension to the at least one optical waveguide, and adjusting at least one of the translation stages to align the at least one optical waveguide concentrically with the axially-elongated surface.

42. A method as defined in claim 36, wherein the sealant exhibits in its liquid phase a viscosity within the range of approximately 3,000 centipoises through approximately 85,000 centipoises.

43. A method as defined in claim 36, wherein the axially elongated surface is defined by at least one tubular body, and the optical waveguide feedthrough assembly further includes a first support mountable within the feedthrough member and defining a first mounting surface for receiving and supporting the tubular body within the feedthrough member, and a second support defining an elongated aperture for receiving therethrough the at least one tubular body, and a second mounting surface for receiving and supporting the first support therein, said method further comprising the steps of:

fixedly securing the tubular body to the first support;

fixedly securing the tubular body and first support to the second support;

installing the at least one optical waveguide within the optical feedthrough cavity; and then introducing the sealant in its liquid phase into the optical feedthrough cavity and allowing the sealant to substantially fill the cavity by capillary action.

\* \* \* \* \*